United States Patent
Parks

(10) Patent No.: US 9,450,683 B2
(45) Date of Patent: Sep. 20, 2016

(54) SYSTEM, METHOD AND APPARATUS FOR COMMUNICATION THAT IS INSENSITIVE TO A SAMPLING CLOCK ERROR

(71) Applicant: LOCKHEED MARTIN CORPORATION, Bethesda, MD (US)

(72) Inventor: Thomas M. Parks, Hamilton, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 14/304,905

(22) Filed: Jun. 14, 2014

(65) Prior Publication Data

US 2014/0369388 A1  Dec. 18, 2014

Related U.S. Application Data

(60) Provisional application No. 61/835,389, filed on Jun. 14, 2013.

(51) Int. Cl.
*H04B 1/00* (2006.01)
*H04B 13/00* (2006.01)
*H04B 1/69* (2011.01)

(52) U.S. Cl.
CPC ....... *H04B 13/00* (2013.01); *H04B 2001/6912* (2013.01)

(58) Field of Classification Search
CPC .............................................. H04B 2215/067
See application file for complete search history.

(56) References Cited

U.S. PATENT DOCUMENTS

| | | | |
|---|---|---|---|
| 2,678,997 A | 5/1954 | Darlington | |
| 4,037,159 A | 7/1977 | Martin | |
| 4,438,519 A | 3/1984 | Bose | |
| 4,453,257 A * | 6/1984 | Lo et al. | 375/296 |
| 5,574,748 A | 11/1996 | Vander Mey et al. | |

(Continued)

FOREIGN PATENT DOCUMENTS

| CN | 102664687 | 9/2012 |
|---|---|---|
| EP | 1086446 | 9/2002 |

(Continued)

OTHER PUBLICATIONS

F. Hlawatsch and G.F. Boudreaux-Bartels, "Linear and Quadratic Time-Frequency Signal Representations," IEEE Signal Processing Magazine, vol. 9, No. 2, Apr. 1992, p. 21-67.

(Continued)

*Primary Examiner* — Santiago Garcia
(74) *Attorney, Agent, or Firm* — Hamre, Schumann, Mueller & Larson, P.C.

(57) ABSTRACT

A system, method and apparatus for digital communication that is insensitive to a sampling clock error. In one embodiment, a digital communication system that is insensitive to a sampling clock error is provided. The digital communication system includes a transmitting communication unit and a receiving communication unit. The transmitting communication unit is configured to generate a digital data communication signal and includes a modulator configured to modulate digital data such that the modulated digital data communication signal is invariant to a stretched frequency scale resulting from a lack of synchronization with a receiving communication unit. The receiving communication unit is configured to receive the digital data communication signal and includes a demodulator configured to demodulate the digital data.

18 Claims, 8 Drawing Sheets

(56) References Cited

U.S. PATENT DOCUMENTS

| | | | |
|---|---|---|---|
| 5,748,670 | A | 5/1998 | Zastrow |
| 6,049,563 | A | 4/2000 | Matsui |
| 6,072,423 | A | 6/2000 | Doisy et al. |
| 6,252,882 | B1 | 6/2001 | Matsui |
| 6,418,158 | B1 | 7/2002 | Vishwanath et al. |
| 6,456,645 | B1* | 9/2002 | Kurrat ............ 375/140 |
| 6,466,609 | B2 | 10/2002 | Koslar et al. |
| 6,614,853 | B1 | 9/2003 | Koslar et al. |
| 6,735,398 | B1* | 5/2004 | Izadpanah et al. ......... 398/189 |
| 6,940,893 | B1 | 9/2005 | Pinkney et al. |
| 6,985,749 | B2 | 1/2006 | Bannasch et al. |
| 7,110,432 | B2 | 9/2006 | Hooton |
| 7,796,943 | B2 | 9/2010 | Levan |
| 2003/0108098 | A1* | 6/2003 | Geddes ............ 375/238 |
| 2004/0071251 | A1* | 4/2004 | Sutioso et al. .......... 375/373 |
| 2005/0243894 | A1* | 11/2005 | Chen et al. ............ 375/139 |
| 2007/0291825 | A1* | 12/2007 | Endoh et al. ............ 375/147 |
| 2008/0089392 | A1 | 4/2008 | Anglin, Jr. |
| 2008/0175306 | A1* | 7/2008 | Matsuoka et al. ......... 375/146 |
| 2009/0059324 | A1* | 3/2009 | Nagase et al. .......... 358/513 |
| 2012/0202429 | A1* | 8/2012 | Wadsworth ............ 455/42 |
| 2012/0307871 | A1 | 12/2012 | Schaffner |
| 2013/0148103 | A1* | 6/2013 | Halmos et al. ........... 356/5.09 |
| 2013/0329843 | A1* | 12/2013 | Takeuchi ............ 375/375 |
| 2014/0043176 | A1* | 2/2014 | Tomasovics et al. ......... 341/143 |
| 2014/0049135 | A1* | 2/2014 | Bargatin et al. .......... 310/306 |

FOREIGN PATENT DOCUMENTS

| | | |
|---|---|---|
| EP | 1458114 | 9/2004 |
| WO | 99/63500 | 12/1999 |

OTHER PUBLICATIONS

S. Pasupathy, "Minimum Shift Keying: A Spectrally Efficient Modulation," IEEE Communications Magazine, Jul. 1979, p. 14-22.

J. Yang and T.K. Sarkar, "Doppler-Invariant Property of Hyperbolic Frequency Modulated Waveforms," Microwave and Optical Technology Letters, vol. 28, No. 6, Jun. 2006, p. 1174-1179.

International Search Report for application No. PCT/US2014/042433, dated Oct. 22, 2014, 3 pages.

Written Opinion for application No. PCT/US2014/042433, dated Oct. 22, 2014, 7 pages.

M.K. Simon, "A Generalization of Minimum-Shift-Keying (MSK)-Type Signaling Based Upon Input Data Symbol Pulse Shaping," IEEE Transactions on Communications, vol. Com-24, No. 8, Aug. 1976, p. 845-856.

Wang Quan, "A Study on Performance Analysis of BOK Chirp Spread Spectrum System," in existence as of Jun. 9, 2014, 5 pages.

"IEEE 802.15.4a," Wikipedia article, in existence as of Jun. 13, 2013, 3 pages.

\* cited by examiner

SYSTEM, METHOD AND APPARATUS FOR COMMUNICATION THAT IS INSENSITIVE TO A SAMPLING CLOCK ERROR

FIELD

This disclosure relates to the field of digital communication. More particularly, this description relates to a system, method and apparatus for digital communication that is insensitive to a sampling dock error.

BACKGROUND

The ability to provide long-distance wireless communication in dangerous and/or obstructed environments, for example in underground mines, is essential for both efficient operation and safety. In some applications, such as coal mining, communication systems are required by regulations for post-accident communications. In these environments, transmitting communication signals through earth, water and rock, for example, in addition to the large amounts of steel and concrete used in associated structures, severely impacts the effective range of a communications signal.

Waveform attenuation can be a significant problem in these embodiments as the sampling clocks in a transmitter and receiver of the communication system are not precisely synchronized. The lack of sampling clock synchronization can result in an undesired frequency shift/stretch of the carrier frequency which can generate an undesirable signal to noise ratio (SNR) penalty. While a phase-locked loop control system or similar feedback control mechanisms can be implemented in the communication system to recover the carrier frequency, these systems can be complex, expensive and may not provide carrier recovery when the communication system is operating at a very low signal to noise ratio.

SUMMARY

This disclosure is directed to a system, method and apparatus for digital communication that is insensitive to a sampling clock error.

The embodiments described herein provide a system, method and apparatus for communicating in a dangerous and/or obstructed environment where carrier signal feedback is not required to achieve carrier signal recovery.

In particular, the embodiments described herein implement the use of a non-linear chirp carrier waveform in which the frequency of the chirp signal changes non-linearly in proportion to time. In some embodiments, the non-linear chirp carrier waveform is a hyperbolic chirp carrier waveform in which the frequency of the chirp signal changes hyperbolically in proportion to time. That is, in a hyperbolic chirp carrier waveform, the frequency changes in inverse proportion to time, or otherwise stated, in proportion to the reciprocal of time. In other embodiments, the non-linear chirp carrier waveform is an exponential chirp carrier waveform in which the frequency of the chirp signal changes exponentially in proportion to time.

By transmitting information using a non-linear chirp carrier waveform, the resulting communication signal can become less sensitive to interference caused by constant-frequency sinusoid waves.

By transmitting information using a hyperbolic chirp carrier waveform, the resulting communication signal can be invariant to a stretched frequency scale resulting from a lack of synchronization between a transmitting communication unit (e.g., a transmitter, a transceiver, etc.) and a receiving communication unit (e.g., a receiver, a transceiver, etc.). That is, any frequency-shifted/stretched version of the hyperbolic chirp carrier waveform received by a communication unit of the digital communication system is identical to a time-shifted version of the hyperbolic chirp carrier waveform transmitted by another communication unit of the digital communication system. Thus, an undesirable SNR penalty occurring because of a sampling clock error can be reduced and/or eliminated.

Also, by transmitting information using a hyperbolic chirp carrier waveform, the resulting communication signal can be invariant to Doppler shifts.

Further, by transmitting information using a hyperbolic chirp carrier waveform, a communication unit of the digital communication system receiving information via the hyperbolic chirp carrier waveform is not required to include a phase-locked loop control system or similar feedback control mechanism to recover the carrier waveform. In fact, in dangerous and/or obstructed environments, a phase-locked loop control system or similar feedback control mechanism may be unstable as the carrier waveform would have a very low amplitude in comparison to noise and interference after being transmitted through rock, earth, water, etc.

In one embodiment, a digital communication system is provided. The digital communication system includes a transmitting communication unit and a receiving communication unit. The transmitting communication unit is configured to transmit digital data. The transmitting communication unit includes a modulator configured to modulate the digital data into a modulated digital data communication signal that is invariant to a stretched frequency scale resulting from a lack of synchronization with a receiving communication unit. The receiving communication unit is configured to receive the modulated digital data communication signal. The receiving communication unit includes a demodulator configured to demodulate the digital data from the modulated digital data communication signal that is invariant to the stretched frequency scale.

In another embodiment, a method for digital communication is provided. The method includes obtaining digital data for transmission. The method also includes modulating the digital data into a modulated digital data communication signal that is invariant to a stretched frequency scale resulting from a lack of synchronization with a receiving communication unit. Also, the method includes a transmitting communication unit transmitting the modulated digital data communication signal.

In yet another embodiment, a transmitting unit for a digital communication system is provided. The transmitting unit includes an interface, a modulator and an antenna. The interface is configured to obtain digital data for transmission. The modulator is connected to the interface and is configured to modulate the digital data into a modulated digital data communication signal that is invariant to a stretched frequency scale resulting from a lack of synchronization with a receiving communication unit. The antenna is connected to the modulator and is configured to transmit the digital data communication signal.

In a further embodiment, a digital communication system that is insensitive to a sampling clock error is provided. The digital communication system includes a transmitting communication unit and a receiving communication unit. The transmitting communication unit is configured to generate a digital data communication signal and includes a modulator configured to modulate digital data onto a non-linear chirp carrier waveform. The receiving communication unit is configured to receive the digital data communication signal and includes a demodulator configured to demodulate the digital data from the non-linear chirp carrier waveform.

DRAWINGS

Figure 4:
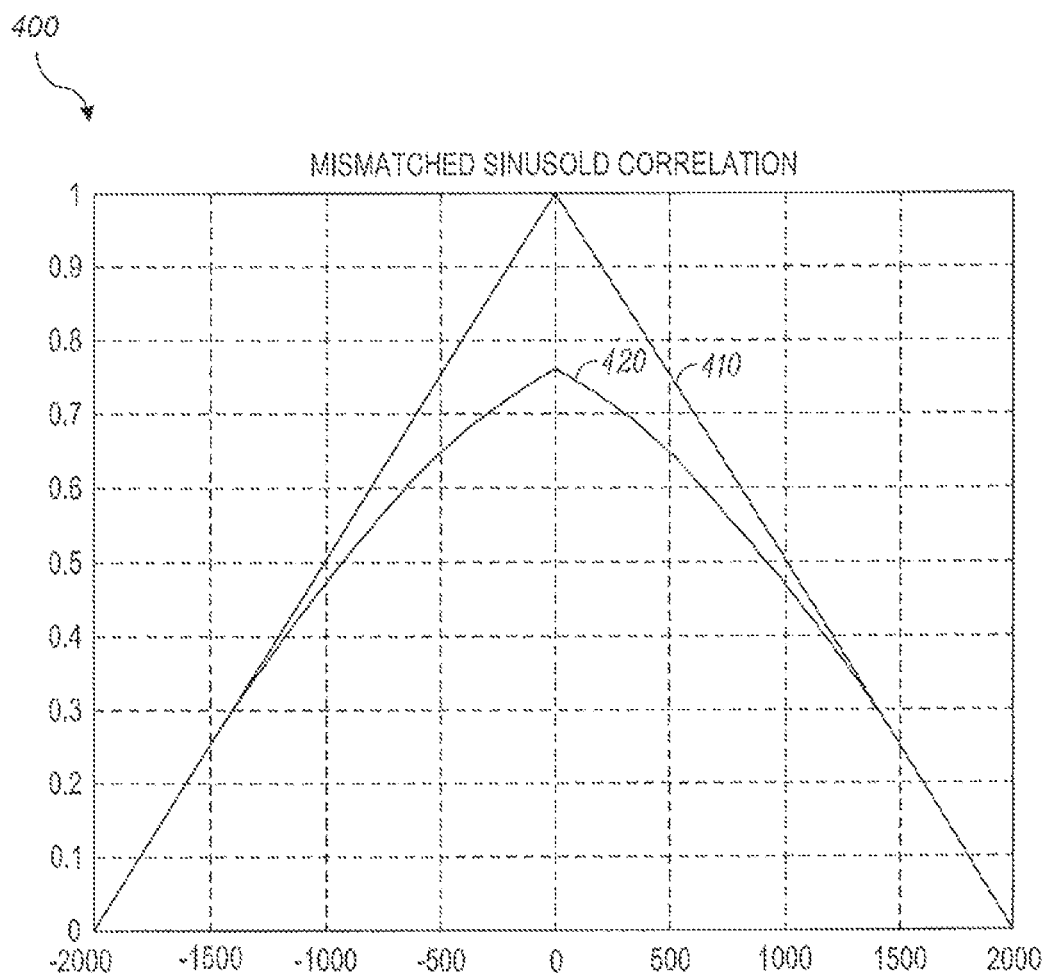
Figure 5:
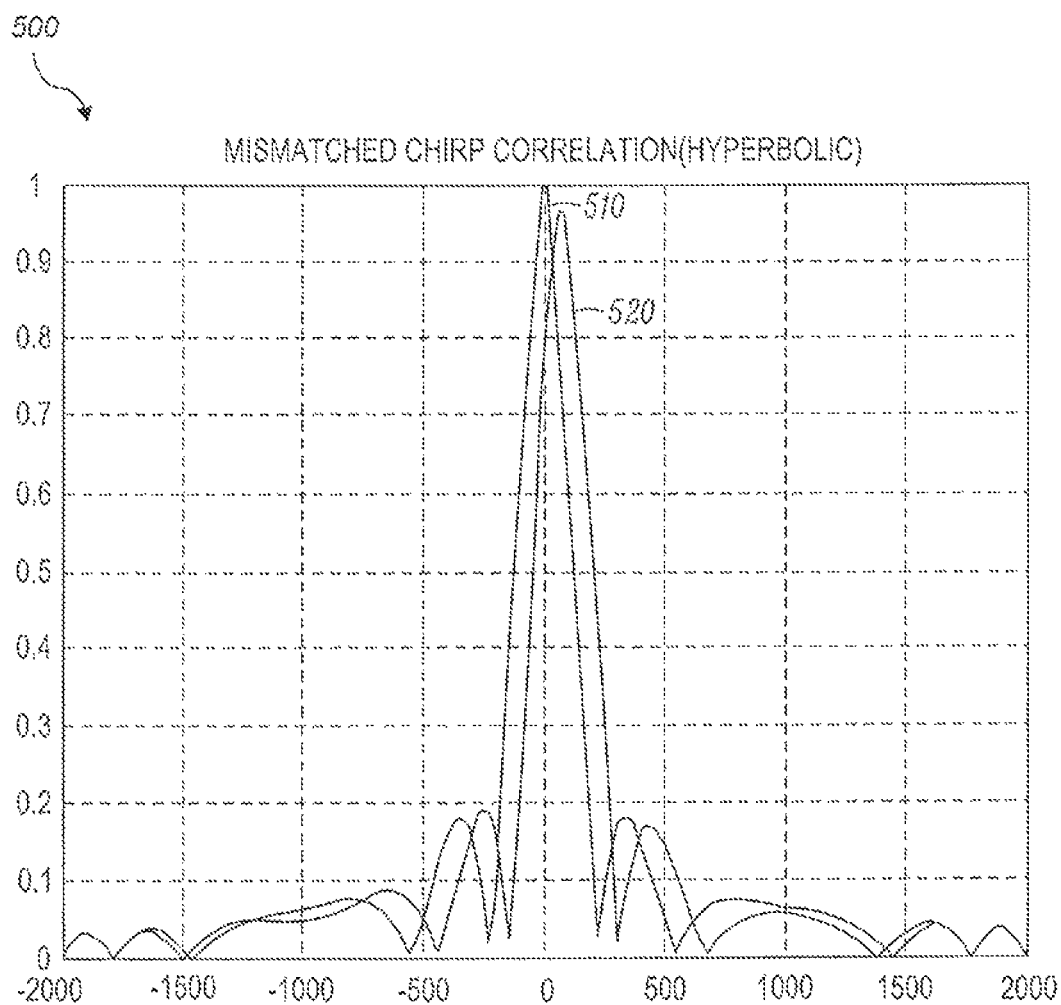

FIG. 4 shows a chart that illustrates a SNR penalty that can occur when a digital data signal is transmitted using a sinusoidal carrier waveform that maintains a constant frequency, for example, in a dangerous and/or obstructed environment; and FIG. 5 shows a chart that illustrates a SNR penalty that can occur when a digital data signal is transmitted using a hyperbolic chirp carrier waveform, for example, in a dangerous and/or obstructed environment.

Figure 6:
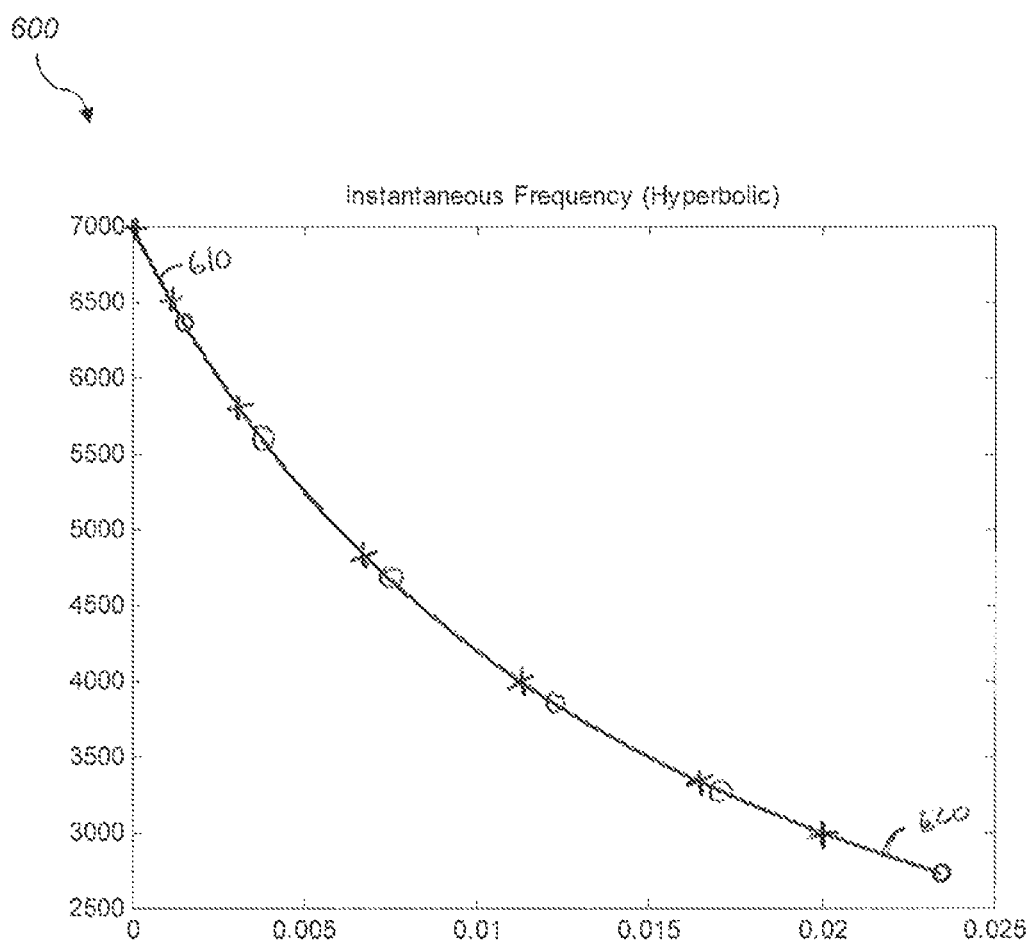

FIG. 6 shows a chart that illustrates a frequency over time of a digital data signal modulated using a hyperbolic chirp carrier waveform.

Figure 7:
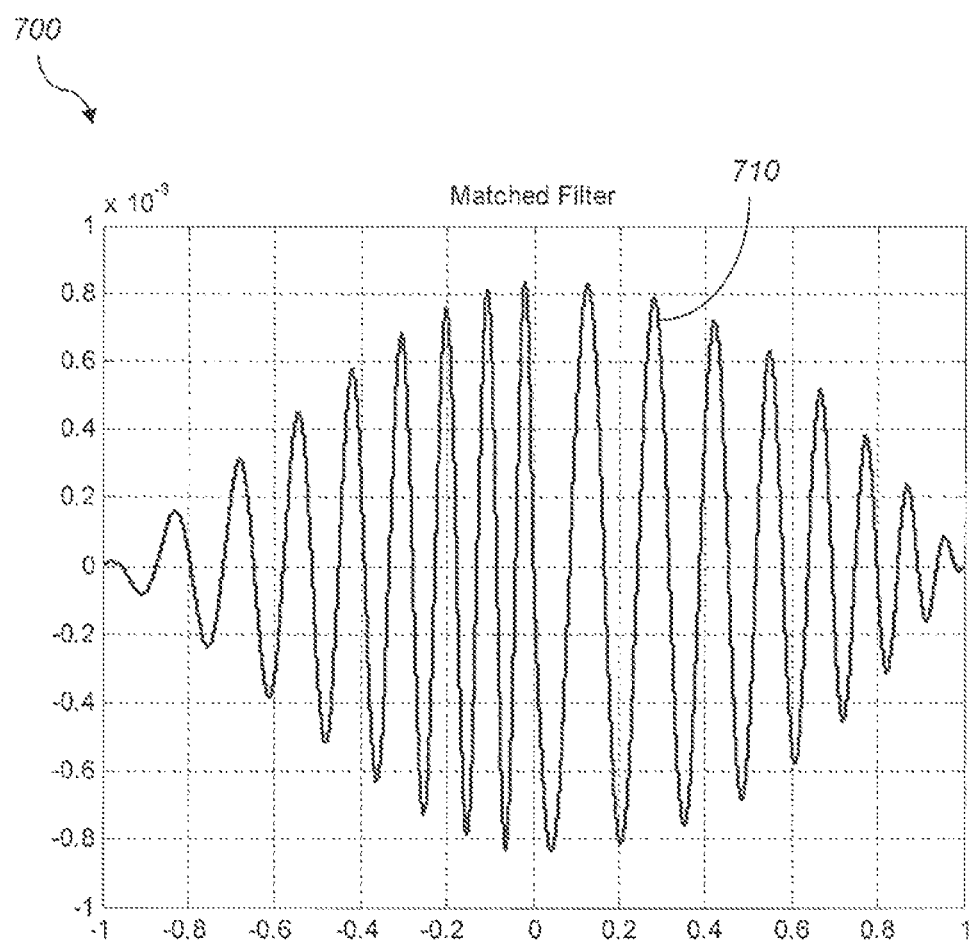

FIG. 7 shows a chart that illustrates minimum shift keying using an equation x(t).

Figure 8:
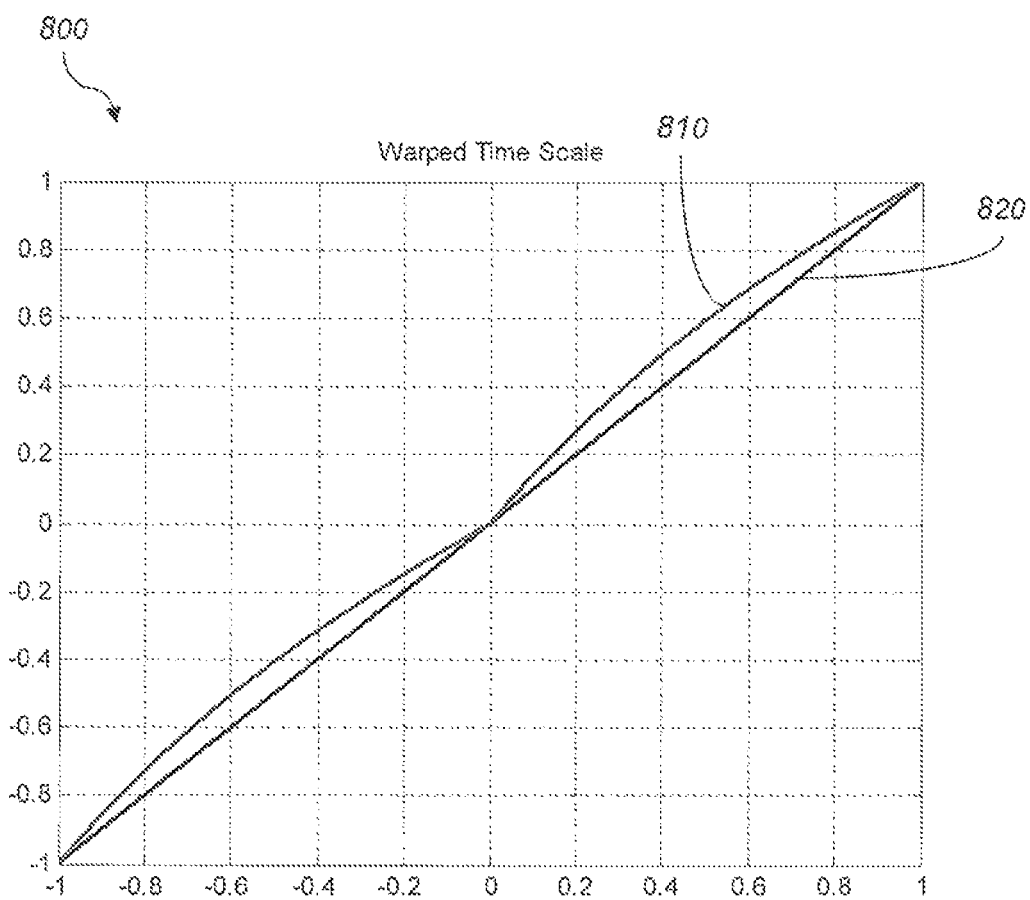

FIG. 8 shows a chart that illustrates a hyperbolic chirp using a non-linear equation u(t).

DETAILED DESCRIPTION

The embodiments provided herein are directed to a digital communication system. Particularly, the embodiments herein provide a system, method and apparatus for digital communication that is insensitive to a sampling clock error.

A chirp carrier waveform as defined herein refers to a sinusoid carrier waveform with a time-varying frequency. A non-linear chirp carrier waveform as defined herein refers to a sinusoid carrier waveform in which the frequency changes non-linearly in proportion to time. A hyperbolic chirp carrier waveform as defined herein refers to a sinusoid carrier waveform in which a frequency changes hyperbolically in proportion to time. An exponential chirp carrier waveform as defined herein refers to a sinusoid carrier waveform in which a frequency changes exponentially in proportion to time.

By transmitting information using a non-linear chirp carrier waveform, the resulting communication signal can become less sensitive to interference caused by constant-frequency sinusoid waves.

By transmitting information using a hyperbolic chirp carrier waveform, the resulting communication signal can be invariant to a stretched frequency scale resulting from a lack of synchronization between a transmitting communication unit (e.g., a transmitter, a transceiver, etc.) and a receiving communication unit (e.g., a receiver, a transceiver, etc.). That is, any frequency-shifted/stretched version of the hyperbolic chirp carrier waveform received by a communication unit of the digital communication system is identical to a time-shifted version of the hyperbolic chirp carrier waveform transmitted by another communication unit of the digital communication system. Thus, an undesirable SNR penalty occurring because of a sampling clock error can be reduced and/or eliminated.

Also, by transmitting information using a hyperbolic chirp carrier waveform, the resulting communication signal can be invariant to Doppler shifts.

Further, by transmitting information using a hyperbolic chirp carrier waveform, a communication unit of the digital communication system receiving information via the hyperbolic chirp carrier waveform is not required to include a phase-locked loop control system or similar feedback control mechanism to recover the carrier waveform. In fact, in dangerous and/or obstructed environments, a phase-locked loop control system or similar feedback control mechanism may be unstable as the carrier waveform would have a very low amplitude in comparison to noise and interference after being transmitted through rock, earth, water, etc.

Equations for a hyperbolic chirp carrier waveform can include:

$$f(t) = \frac{f_0}{kt+1}, kt > -1$$

$$k = \frac{f_0 - f_T}{f_T T}$$

$$\varphi(t) = \varphi_0 + 2\pi f_0 \frac{\ln(kt+1)}{k}$$

Equations for an exponential chirp carrier waveform can include:

$$f(t) = f_0 k^t$$

$$k = \sqrt[T]{\frac{f_T}{f_0}}$$

$$\varphi(t) = \varphi_0 + 2\pi f_0 \frac{(k^t - 1)}{\ln k}$$

In the equations above: f(t) is an instantaneous frequency as a function of time; $f_0$ is the frequency at time t=0; $f_T$ is the frequency at time t=T, where T is the duration of one symbol; $\phi(t)$ is the phase as a function of time; and $\phi_0$ is the phase at time t=0.

It will be appreciated that the embodiments described herein can be used in a digital communication system. Examples of a digital communication system that can be used in conjunction with the embodiments provided herein are disclosed in U.S. Pat. No. 7,796,943, filed on Mar. 28, 2007, titled SUB-SURFACE COMMUNICATIONS SYSTEM AND METHOD, which is herewith incorporated by reference in its entirety. Another example of a digital communication system that can be used in conjunction with the embodiments provided herein can be a home automation network such as a low power home automation network operating at frequencies in the gigahertz (GHz) range. It will be appreciated that the embodiments described herein can be used with any type of digital communication system, particularly in digital communication systems that are operating at the limit of their range, where the SNR penalty is negatively impacting operation of the digital communication system. This allows the digital communication system to achieve, for example, a farther range and a more reliable communication.

Figure 1:
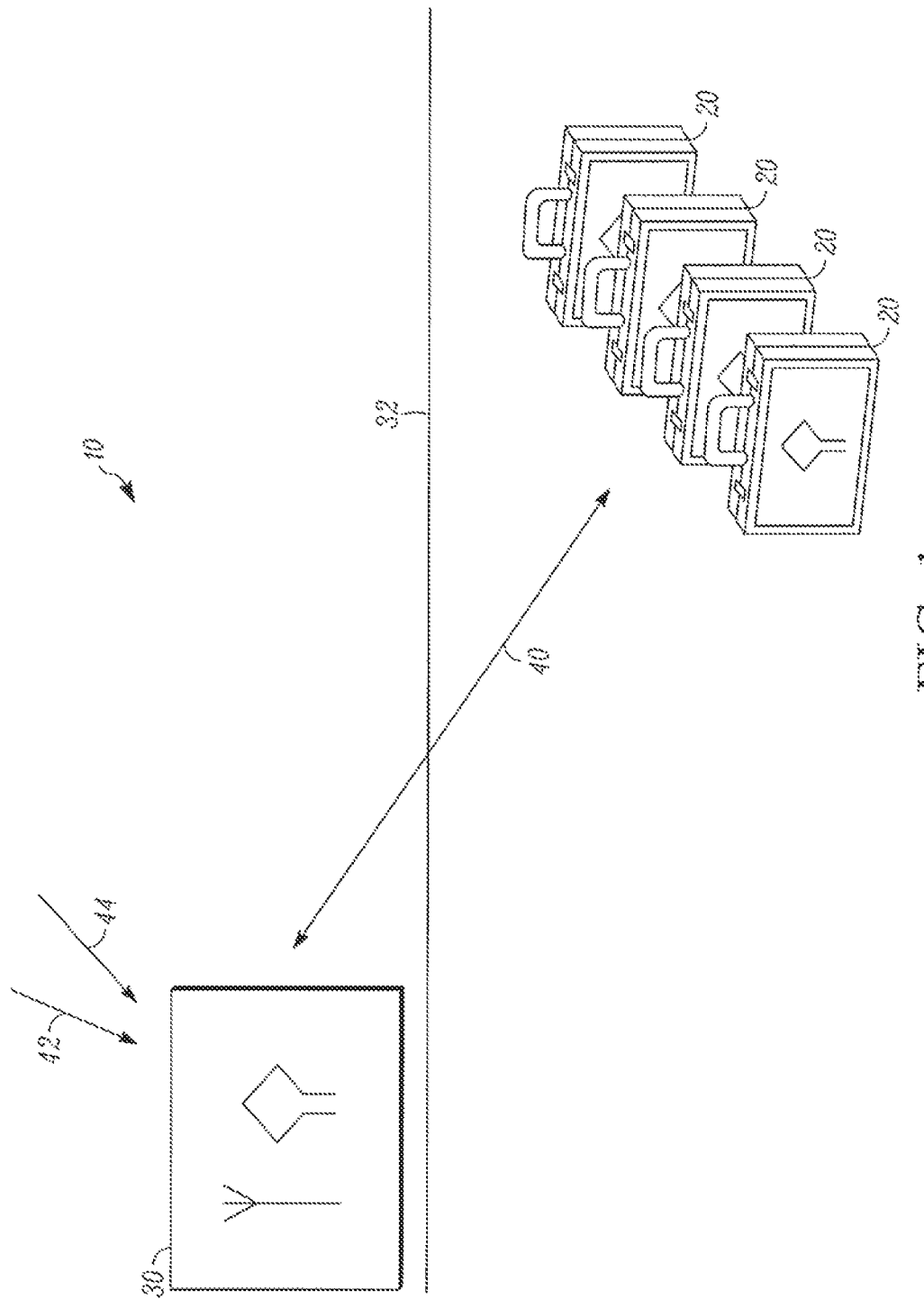
FIG. 1 illustrates a diagram of a digital communication system according to one embodiment.

Referring first to FIG. 1, there is shown a diagram of a digital communication system 10, according to one embodiment. Digital communication system 10 includes a plurality of sub-surface portable transceivers each labeled 20. Each transceiver 20 may be underground portable, and/or underwater portable, for example. System 10 includes a base transceiver 30. In one embodiment of system 10, base transceiver 30 is on or above a surface 32. The surface 32 may take the form of the planet surface (e.g., surface of the Earth), or a surface within the planet (e.g., in a tunnel from the surface of the Earth). In the illustrated embodiment, the transceivers 20 and the base transceiver 30 communicate with one-another via one or more communication signals 40.

According to one embodiment, the transceivers 20 may be well suited for being carried by personnel into, for example, an underground mine, cave and/or into a shallow sea water (littoral waters). For example, the transceivers 20 may be suited for being carried on the order of about 2,000 feet underground into a mine, below surface 32, yet still be in communication (via the one or more signals 40) with the base transceiver 30. While four (4) portable transceivers 20 and one (1) base transceiver 30 are shown for purposes of illustration in FIG. 1, other combinations are expected to be used in actual practice.

Figure 2:
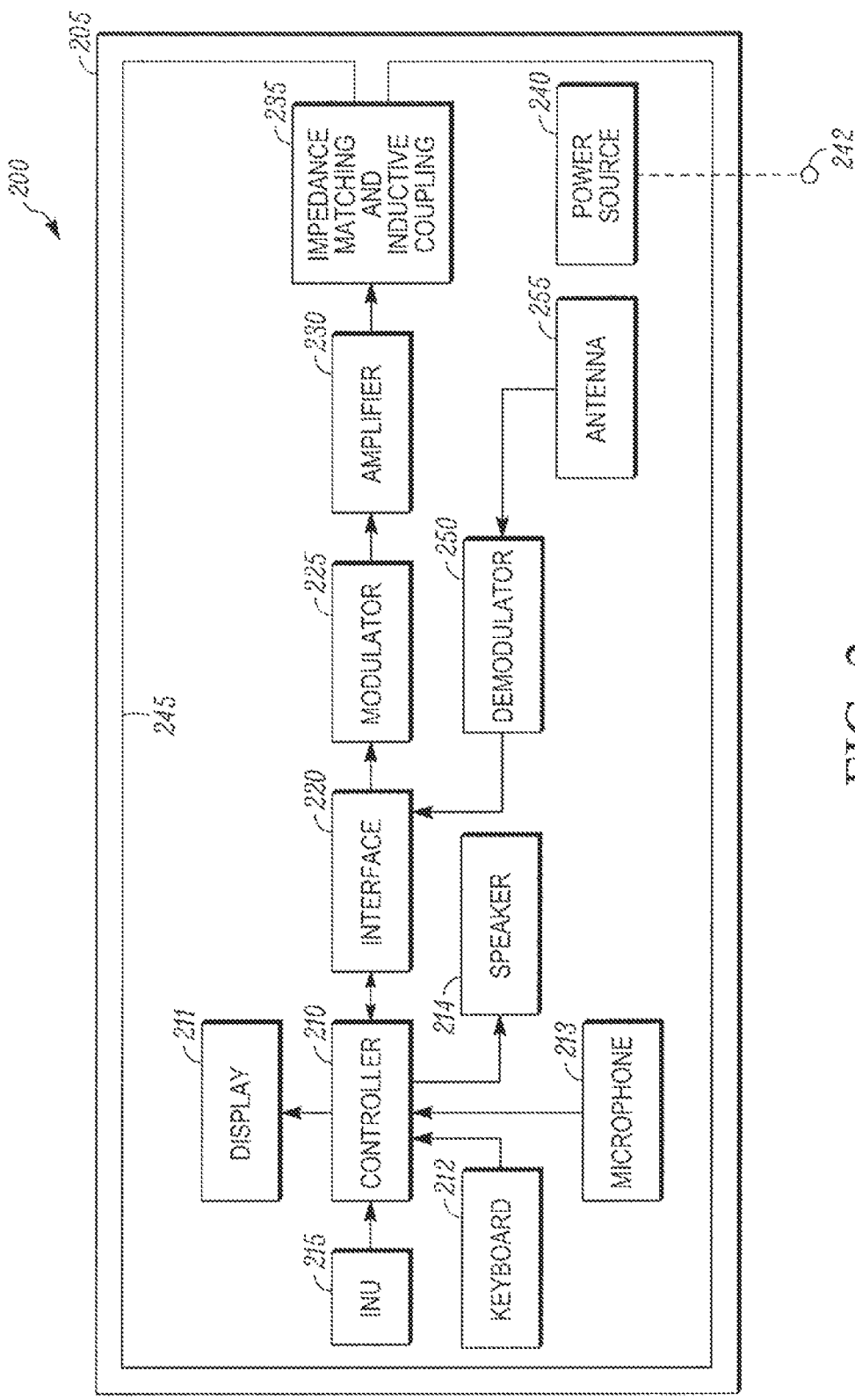
FIG. 2 illustrates a block diagram of a portable transceiver according to one embodiment.

Referring now also to FIG. 2, there is shown a block diagram of a transceiver 200 being suitable for use as a transceiver 20 according to one embodiment. The transceiver 200 includes a housing 205. Within the housing 205 is a controller 210. The controller 210 may typically take the form of a computing device that includes a processor. A processor generally includes a Central Processing Unit (CPU), such as a microprocessor. A CPU generally includes an arithmetic logic unit (ALU), which performs arithmetic and logical operations, and a control unit, which extracts instructions (e.g., code) from memory and decodes and executes them, calling on the ALU when necessary. "Memory", as used herein, generally refers to one or more devices capable of storing data, such as in the form of chips, tapes, disks or drives. Memory may take the form of one or more random-access memory (RAM), read-only memory (ROM), programmable read-only memory (PROM), erasable programmable read-only memory (EPROM), or electrically erasable programmable read-only memory (EEPROM) chips, by way of further example only. Memory may take the form of internal or external disc drives, for example. Memory may be internal or external to an integrated unit including a processor. Memory preferably stores a computer program or code, e.g., a sequence of instructions being operable by a processor.

The controller 210 may take the form of hardware, such as an Application Specific Integrated Circuit (ASIC) and or firmware, in addition or in lieu of incorporating a processor. The controller 210 may include an encoder for encoding the data or information bearing signals according to one or more encoding techniques, as is known in the art, for subsequent modulation, transmission, reception, demodulation, decoding and processing. Such encoding techniques as multi-carrier modulation (e.g., multiple frequency-shift keying) and convolutional coding are suitable for application to the present application.

According to one embodiment, the controller 210 may take the form of a portable, personal computer, such as a conventional lap-top computer, having a conventional microphone, a speaker and a inertial navigation unit (INU) operatively coupled thereto.

Also contained within the housing 205 is a display 211, a keyboard 212, a microphone 213, a speaker 214, an INU 215, an interface 220, a modulator 225, an amplifier 230, an impedance matching and inductive coupler 235, a power source 240, a loop antenna 245, a demodulator 250, and an antenna 255.

The interface 220 is operatively coupled to the controller 210. According to one embodiment, the interface 220 is configured/programmed to communicate with the controller 210.

The modulator 225 is coupled to interface 220. According to one embodiment, modulator 225 may modulate the digital data for transmission using a non-linear chirp carrier waveform. In some embodiments, the non-linear chirp carrier waveform is a hyperbolic chirp carrier waveform. In other embodiments, the non-linear chirp carrier waveform is an exponential chirp carrier waveform.

The power source 240 is illustrated as being contained within housing 205, but may optionally be external thereto. Alternatively, power source 240 may be contained within housing 205, and include terminals 242 that extend from housing 205. Terminals 242 may optionally be used to provide additional power to supply 240, and/or charge supply 240. Terminals 242 may optionally be used to provide power from supply 240 to power one or more devices external to housing 205. Power supply 240 may be coupled to the other components of transceiver 200 to power them. In one embodiment, power supply 240 may take the form of a rechargeable battery, and provide voltage outputs of about +/−5 VDC and +/−12 VDC.

The demodulator 250 is coupled to an antenna 255. The antenna 255 may be adapted for receiving communications from the transceiver 30 (FIG. 1). The demodulator 250 is also coupled to the interface 220. According to one embodiment, the demodulator 250 may demodulate the transmitted digital information from the non-linear chirp carrier waveform. In some embodiments, the non-linear chirp carrier waveform is a hyperbolic chirp carrier waveform. In other embodiments, the non-linear chirp carrier waveform is an exponential chirp carrier waveform.

By transmitting information using a hyperbolic chirp carrier waveform, the resulting communication signal 40 can be invariant to a stretched frequency scale resulting from a lack of synchronization between the transceiver 20 and the base transceiver 30. Thus, any frequency-shifted/stretched version of the hyperbolic chirp carrier waveform received by base transceiver 30 is identical to a time-shifted version of the hyperbolic chirp carrier waveform transmitted by the transceiver 20. Thus, an undesirable SNR penalty occurring because of a sampling clock error can be reduced and/or eliminated.

The demodulator 250 can be used to demodulate the transmitted digital data modulated by a modulator 345 (see FIG. 3) and if encoding of the transceiver 300 is implemented, a corresponding demodulator/decoder of the transceiver 200 can provide decoding of the encoded transmitted data/information signals as is understood by those skilled in the arts. Alternatively, the transceiver 200 may incorporate the components of transceiver 300 of FIG. 3, or in addition to the components discussed hereinabove.

Figure 3:
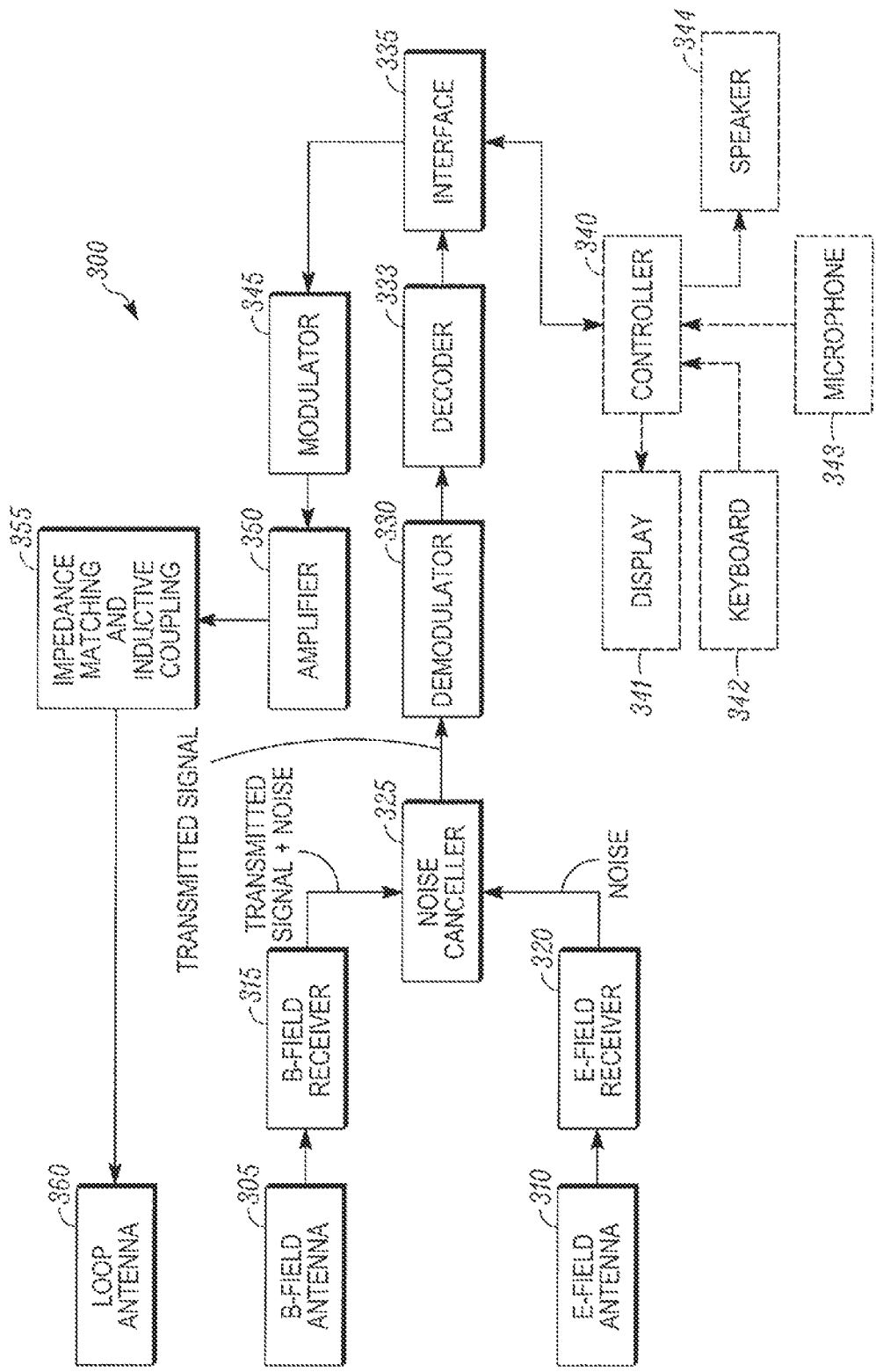
FIG. 3 illustrates a block diagram of a base transceiver according to one embodiment.

The transceiver 200 may further optionally include a decoder as discussed with regard to the decoder 333 of FIG. 3 (for the case where the controller 340 of FIG. 3 operates to encode data/information signals for transmission to the transceiver 200).

Referring now to FIG. 3, there is shown a block diagram of a transceiver 300 being suitable for use as a transceiver 30 according to one embodiment. In the illustrated embodiment, the transceiver 300 includes both magnetic (b-field) and electric (e-field) antennas 305, 310. Also, the transceiver 300 includes magnetic (b-field) and electric (e-field) receivers 315, 320. The receiver 315 is coupled to the antenna 305. The receiver 320 is coupled to the antenna 310.

According to one embodiment, the receiver 315 may include a tuned circuit, automatic gain control and pre-amplifier for receiving signals transmitted from the transceivers 20, in addition to the magnetic component of ambient electromagnetic noise. In one embodiment, the receiver 315 may take the form of a conventional audio amplifier due to the low audio frequencies of the received signals. According to one embodiment, the receiver 320 may include a tuned circuit, an automatic gain control and a pre-amplifier for receiving the electric component of electromagnetic noise corresponding to the magnetic component of electromagnetic noise received via the antenna 305 and the receiver 315. The receiver 320 may similarly take the form of a conventional tow frequency audio amplifier device.

In the illustrated embodiment, the transceiver 300 also includes a noise canceller 325 coupled to the receivers 315, 320.

The transceiver 300 also includes a demodulator 330. The demodulator 330 is coupled to noise canceller 325. The noise cancelled, demodulated signal is then input into a decoding processor or decoder 333. The decoding processor or decoder 333 operates on an input demodulated signal to decode the signal encoded by the controller 240. The decoder 333 operates to further separate the data or information bearing signal components associated with the original signal (from the transceiver 20).

The demodulated, decoded signal output from the decoder 333 may be provided to an interface 335. The interface 335 may be operatively coupled to a controller, optionally the illustrated controller 340. The interface 335 may provide data input/output, that may be coupled to a conventional computing device external to the transceiver 300. Where the components of the transceiver 300 are incorporated into the transceiver 200 (FIG. 2), the interface 220 may serve as the interface 335, and the controller 210 may serve as a digital data source and sink.

In the illustrated embodiment, the transceiver 300 may optionally include a controller 340. The controller 340 may typically take the form of a computing device that includes a processor. The controller 340 may optionally include an encoder for encoding data or information bearing signals according to one or more encoding techniques, such as multi-carrier modulation (e.g., multiple frequency-shift keying), convolutional coding and so on, as is known in the art, for subsequent modulation, transmission, reception, demodulation, decoding and processing. In the illustrated embodiment, the transceiver 300 may optionally include a display 341, a keyboard 342, a microphone 343, and a speaker 344.

Referring still to FIG. 3, the illustrated embodiment of the transceiver 300 also includes a modulator 345. The modulator 345 is coupled to the interface 335.

According to one embodiment, the one or more signals 40 (FIG. 1) take the form of low frequency signals (e.g., low frequency magnetic signals) and transmit data at a low bit rate. By way of non-limiting example, the one or more signals 40 may be below 10 kHz. Also, the one or more signals 40 may carry digitized information between the transceivers 20, 30 at a rate of around 100 bits per second or slower. The low frequency signal and low bit rate is provided to allow for long distance communication in a dangerous and/or obstructed environment. That is, the frequency range used to transmit data can significantly impact a transmission distance through an obstructed environment such as rock and earth.

Referring back to FIG. 2, the controller 210 serves as a digital data source, e.g., a source of digitized voice communications input via the microphone 213 and/or alphanumeric data entered via the keyboard 212. In other words, either voice activity conventionally captured by the microphone 213 and digitized by an analog/digital conversion functionality of the controller 210 and/or data conventionally captured using the keyboard 212 is used to provide digital data indicative thereof. The digital data is provided to the interface 220. The interface 220 receives the digital data and transmits it to the modulator 225. The modulator 225 may modulate the digital data for transmission using anonlinear chirp carrier waveform. In some embodiments, the non-linear chirp carrier waveform is a hyperbolic chirp carrier waveform. In other embodiments, the non-linear chirp carrier waveform is an exponential chirp carrier waveform.

Referring back to FIG. 3, the transceiver 300 includes two antennas 305, 310. The antenna 305 is configured to receive substantially only magnetic field (b-field) components while the antenna 310 is configured to receive substantially only electric field (e-field) components. Due to signal propagation through Earth materials (e.g., rock and water), primarily only the magnetic component of the one or more signals 40 may reach the transceiver 30. The frequency modulated digital data carried by the received signal 40 is passed by the noise canceller 325 to the demodulator 330.

According to one embodiment, the demodulator 330 may demodulate the transmitted digital information from the non-linear chirp carrier waveform. In some embodiments, the non-linear chirp carrier waveform is a hyperbolic chirp carrier waveform. In other embodiments, the non-linear chirp carrier waveform is an exponential chirp carrier waveform. By transmitting information using a hyperbolic chirp carrier waveform, the resulting communication signal 40 can be invariant to a stretched frequency scale resulting from a lack of synchronization between the base transceiver 30 and the transceiver 20. Thus, any frequency-shifted/stretched version of the hyperbolic chirp carrier waveform received by transceiver 20 is identical to a time-shifted version of the hyperbolic chirp carrier waveform transmitted by the base transceiver 30. Thus, an undesirable SNR penalty occurring because of a sampling clock error can be reduced and/or eliminated.

It is to be appreciated that communication of data transmitted from the transceiver 300 to the transceiver 200 could follow a similar methodology as described above, in reverse.

FIG. 4 shows a chart 400 that illustrates a SNR penalty that can occur when a digital data signal is transmitted using a sinusoidal carrier waveform that maintains a constant frequency, for example, in a dangerous and/or obstructed environment. In particular, the chart 400 shows a digital data signal 410 received by a receiving communication unit (e.g., the base transceiver 30) that is in perfect clock synchronization with a transmitting communication unit (e.g., the transceiver 20). The chart 400 also shows a digital data signal 420 received by a receiving communication unit that is not in perfect clock synchronization with the transmitting communication unit. That is, the difference between the digital data signal 410 and the digital data signal 420 is the result of a lack of synchronization between a sampling clock of the transmitting communication unit and a sampling clock of the receiving communication unit. In this example, the sinusoidal carrier waveform that maintains a constant frequency results in a ~2.5 dB penalty. Also, the peak output of the received digital data signal 420 is reduced.

FIG. 5 shows a chart 500 that illustrates a SNR penalty that can occur when a digital data signal is transmitted using a hyperbolic chirp carrier waveform, for example, in a dangerous and/or obstructed environment. In particular, the chart 500 shows a digital data signal 510 received by a receiving communication unit (e.g., the base transceiver 30) that is in perfect clock synchronization with a transmitting communication unit (e.g., the transceiver 20). The chart 500 also shows a digital data signal 520 received by the receiving communication unit that is not in perfect clock synchronization with the transmitting communication unit. That is, the difference between the digital data signal 510 and the digital data signal 520 is the result of a lack of synchronization between a sampling clock of the transmitting communication unit and a sampling clock of the receiving communication unit. In this example, the hyperbolic chirp sinusoidal carrier waveform results in only a ~0.3 dB penalty.

Accordingly, using a hyperbolic chirp carrier waveform as opposed to a sinusoidal carrier waveform that maintains a constant frequency can result in a drop of the SNR penalty from ~2.5 dB to ~0.3 dB.

FIG. 6 shows a chart 600 that illustrates a frequency over time of a digital data signal modulated using a hyperbolic chirp carrier waveform. The horizontal axis represents a time in seconds and the vertical axis represents a frequency in Hertz. The chart 600 shows a digital data signal 610 received by a receiving communication unit the base transceiver 30) that is in perfect clock synchronization with a transmitting communication unit (e.g., the transceiver 20). The chart 500 also shows a digital data signal 620 received by the receiving communication unit that is not in perfect clock synchronization with the transmitting communication unit. As shown in the chart 600, the digital data signal 610 and the digital data signal 620 are nearly identical. Thus, a digital data signal modulated using a hyperbolic chirp carrier waveform can be transmitted with minimal SNR penalty regardless of whether the transmitting communication unit and the receiving communication unit are in perfect clock synchronization.

It will be appreciated that the details of the modulated waveform, as described in the embodiments herein, may vary (such as the choice of e.g., the data rate; the carrier frequency, etc.) departing from the scope and the spirit of the disclosure.

In some embodiments, the non-linear (e.g., hyperbolic, exponential, etc.) chirp carrier waveform can be modulated using minimum shift keying to achieve a constant amplitude and a continuous phase.

Equations for a hyperbolic chirp carrier waveform using minimum shift keying can include:

$$x(t) = \cos\left(\frac{\pi u(t)}{2T}\right)e^{j2\pi f_c u(t)}, -T \le t < T$$

$$u(t) = \frac{a}{\omega_c b}\ln\left(\frac{bt}{c}+1\right)$$

$$a = \omega_0 \omega_T T$$

$$b = \omega_0 - \omega_T$$

$$c = \omega_T T$$

$$\omega_0 e^{\omega_c/\omega_0} = \omega_T e^{\omega_c/\omega_T}$$

$$\omega_T = \frac{-\omega_c}{W\left(\frac{-\omega_c}{\omega_0}e^{-\omega_c/\omega_0}\right)}$$

In these equations, x(t) is an equation for minimum shift keying and u(t) is an equation for a hyperbolic chirp carrier waveform. Also: $\omega_c$ is a carrier frequency; $\omega_0$ is a frequency at time t=0; $\omega_T$ a frequency at time=T; and W is a Lambert W function (also referred to as an omega function or a product logarithm).

FIG. 7 shows a chart 700 that illustrates minimum shift keying using the equation x(t) provided above. In particular, the chart 700 illustrates the equation x(t) provided above via line 710 with the horizontal axis representing time normalized by T and the vertical axis representing amplitude (e.g., voltage).

FIG. 8 shows a chart 800 that illustrates a hyperbolic chirp using the non-linear equation u(t) provided above. In particular, the chart 800 illustrates the non-linear equation u(t) provided above via line 810 and a linear baseline line 820 where t=T. In the chart 800, the horizontal axis represents time normalized by T and the vertical axis represents the non-linear equation u(t) provided above.

As shown in FIGS. 7 and 8, a digital data signal can be transmitted with a constant amplitude and a continuous phase. Accordingly, for example, in a power constrained digital communication system, a digital data signal (that uses minimum shift keying and a non-linear chirp carrier waveform) can be transmitted that maximizes the amount of power available for use by the digital communication system. Also, the use of minimum shift keying can reduce sensitivity to sinusoidal interference and provide optimal symbol separation.

Aspects:

It is appreciated that any of aspects 1-6, 7-14 and 15-20 can be combined.

1. A digital communication system comprising:
a transmitting communication unit configured to transmit digital data, the transmitting communication unit including a modulator configured to modulate the digital data into a modulated digital data communication signal that is invariant to a stretched frequency scale resulting from a lack of synchronization with a receiving communication unit;
a receiving communication unit configured to receive the modulated digital data communication signal, the receiving communication unit including a demodulator configured to demodulate the digital data from the modulated digital data communication signal that is invariant to the stretched frequency scale.

2. The digital communication system of aspect 1, wherein the modulator is configured to modulate the digital data onto a non-linear chirp carrier waveform, and
the demodulator is configured to demodulate the digital data from the non-linear chirp carrier waveform.

3. The digital communication system of aspect 2, wherein the non-linear chirp carrier waveform is a hyperbolic chirp carrier waveform.

4. The digital communication system of aspect 3, wherein the modulator is configured to modulate the digital data onto the hyperbolic chirp carrier waveform using the equations:

$$f(t) = \frac{f_0}{kt+1}, kt > -1$$

$$k = \frac{f_0 - f_T}{f_T T}$$

$$\varphi(t) = \varphi_0 + 2\pi f_0 \frac{\ln(kt+1)}{k}.$$

5. The digital communication system of aspect 2, wherein the non-linear chirp carrier waveform is an exponential chirp carrier waveform.

6. The digital communication system of aspect 5, wherein the modulator is configured to modulate the digital data onto the exponential chirp carrier waveform using the equations:

$$f(t) = f_0 k^t$$

$$k = \sqrt[T]{\frac{f_T}{f_0}}$$

$$\varphi(t) = \varphi_0 + 2\pi f_0 \frac{(k^t - 1)}{\ln k}.$$

7. A method for digital communication, the method comprising:
   obtaining digital data for transmission;
   modulating the digital data into a modulated digital data communication signal that is invariant to a stretched frequency scale resulting from a lack of synchronization with a receiving communication unit; and
   a transmitting communication unit transmitting the modulated digital data communication signal.

8. The method of aspect 7, wherein modulating the digital data into the modulated digital data communication signal includes modulating the digital data onto a non-linear chirp carrier waveform.

9. The method of any of aspects 7-8, further comprising:
   a receiving communication unit receiving the modulated digital data communication signal; and
   demodulating the digital data from the modulated digital data communication signal.

10. The method of aspect 9, wherein demodulating the digital data from the modulated digital data communication signal includes demodulating the digital data from a non-linear chirp carrier waveform.

11. The method of any of aspects claim 8-10, wherein the non-linear chirp carrier waveform is a hyperbolic chirp carrier waveform.

12. The method of aspect 11, wherein modulating the digital data onto the hyperbolic chirp carrier waveform includes modulating the digital data using the equations:

$$f(t) = \frac{f_0}{kt + 1}, kt > -1$$

$$k = \frac{f_0 - f_T}{f_T T}$$

$$\varphi(t) = \varphi_0 + 2\pi f_0 \frac{\ln(kt + 1)}{k}.$$

13. The method of any of aspects 8-10, wherein the non-linear chirp carrier waveform is an exponential chirp carrier waveform.

14. The method of aspect 13, wherein modulating the digital data onto the exponential chirp carrier waveform includes modulating the digital data using the equations.

$$f(t) = f_0 k^t$$

$$k = \sqrt[T]{\frac{f_T}{f_0}}$$

$$\varphi(t) = \varphi_0 + 2\pi f_0 \frac{(k^t - 1)}{\ln k}.$$

15. A transmitting unit for a digital communication system, the transmitting unit including:
   an interface configured to obtain digital data for transmission;
   a modulator connected to the interface, the modulator configured to modulate the digital data into a modulated digital data communication signal that is invariant to a stretched frequency scale resulting from a lack of synchronization with a receiving communication unit;
   an antenna connected to the modulator, the antenna configured to transmit the digital data communication signal.

16. The transmitting unit of aspect 15, wherein the modulator is configured to modulate the digital data onto a non-linear chirp carrier waveform.

17. The transmitting unit of aspect 16, wherein the non-linear chirp carrier waveform is a hyperbolic chirp carrier waveform.

18. The transmitting unit of aspect 17, wherein the modulator is configured to modulate the digital data onto the hyperbolic chirp carrier waveform using the equations:

$$f(t) = \frac{f_0}{kt + 1}, kt > -1$$

$$k = \frac{f_0 - f_T}{f_T T}$$

$$\varphi(t) = \varphi_0 + 2\pi f_0 \frac{\ln(kt + 1)}{k}.$$

19. The transmitting unit of aspect 16, wherein the non-linear chirp carrier waveform is an exponential chirp carrier waveform.

20. The transmitting unit of aspect 19, wherein the modulator is configured to modulate the digital data onto the exponential chirp carrier waveform using the equations:

$$f(t) = f_0 k^t$$

$$k = \sqrt[T]{\frac{f_T}{f_0}}$$

$$\varphi(t) = \varphi_0 + 2\pi f_0 \frac{(k^t - 1)}{\ln k}.$$

With regard to the preceding description, it is to be understood that changes may be made in detail, especially in matters of the construction materials employed and the shape, size, and arrangement of parts without departing from the scope of the present disclosure. The word "embodiment" as used within this Specification may, but does not necessarily, refer to the same embodiment. This Specification and the embodiments described are exemplary only. Other and further embodiments may be devised without departing from the basic scope thereof, with the true scope and spirit of the disclosure being indicated by the claims that follow.

The invention claimed is:
1. A digital communication system comprising:
   a transmitting communicator and a receiving communicator,
   the transmitting communicator including a modulator that modulates digital data into a modulated digital data communication signal that is invariant to a stretched frequency scale resulting from a lack of synchronization with the receiving communicator, and the trans- mitting communicator transmits the modulated digital data communication signal;

the receiving communicator receiving the transmitted modulated digital data communication signal, the receiving communicator including a demodulator that demodulates the digital data from the received modulated digital data communication signal that is invariant to the stretched frequency scale;

the modulator modulates the digital data onto a non-linear chirp carrier waveform;

the demodulator demodulates the digital data from the non-linear chirp carrier waveform;

the non-linear chirp carrier waveform is a hyperbolic chirp carrier waveform;

the modulator modulates the digital data onto the hyperbolic chirp carrier waveform using the equations:

$$f(t) = \frac{f_0}{kt+1}, kt > -1$$

$$k = \frac{f_0 - f_T}{f_T T}$$

$$\varphi(t) = \varphi_0 + 2\pi f_0 \frac{\ln(kt+1)}{k}$$

where f(t) is an instantaneous frequency as a function of time; $f_0$ is the frequency at time t=0; $f_T$ is the frequency at time t=T, where T is the duration of one symbol; φ(t) is the phase as a function of time; and $\phi_0$ is the phase at time t=0.

2. A digital communication system comprising:

a transmitting communicator and a receiving communicator, the transmitting communicator including a modulator that modulates digital data into a modulated digital data communication signal that is invariant to a stretched frequency scale resulting from a lack of synchronization with the receiving communicator, and the transmitting communicator transmits the modulated digital data communication signal;

the receiving communicator receiving the transmitted modulated digital data communication signal, the receiving communicator including a demodulator that demodulates the digital data from the received modulated digital data communication signal that is invariant to the stretched frequency scale;

the modulator modulates the digital data onto a non-linear chirp carrier waveform;

the demodulator demodulates the digital data from the non-linear chirp carrier waveform;

the non-linear chirp carrier waveform is an exponential chirp carrier waveform; and the modulator modulates the digital data onto the exponential chirp carrier waveform using the equations:

$$f(t) = f_0 k^t$$

$$k = T\sqrt{\frac{f_T}{f_0}}$$

$$\varphi(t) = \varphi_0 + 2\pi f_0 \frac{(k^t - 1)}{\ln k}$$

where f(t) is an instantaneous frequency as a function of time; $f_0$ is the frequency at time t=0; $f_T$ is the frequency at time t=T, where T is the duration of one symbol; φ(t) is the phase as a function of time; and $\phi_0$ is the phase at time t=0.

3. A method of digital communication, the method comprising:

obtaining digital data for transmission by a transmitting communicator;

the transmitting communicator modulating the digital data into a modulated digital data communication signal that is invariant to a stretched frequency scale resulting from a lack of synchronization with a receiving communicator, modulating the digital data into the modulated digital data communication signal includes modulating the digital data onto a non-linear chirp carrier waveform where the non-linear chirp carrier waveform is a hyperbolic chirp carrier waveform;

wherein modulating the digital data onto the hyperbolic chirp carrier waveform includes modulating the digital data using the equations:

$$f(t) = \frac{f_0}{kt+1}, kt > -1$$

$$k = \frac{f_0 - f_T}{f_T T}$$

$$\varphi(t) = \varphi_0 + 2\pi f_0 \frac{\ln(kt+1)}{k}$$

where f(t) is an instantaneous frequency as a function of time; $f_0$ is the frequency at time t=0; $f_T$ is the frequency at time t=T, where T is the duration of one symbol; φ(t) is the phase as a function of time; and $\phi_0$ is the phase at time t=0; and the transmitting communicator transmitting the modulated digital data communication signal.

4. The method of claim 3, further comprising:

a receiving communicator that receives the modulated digital data communication signal; and the receiving communicator demodulating the digital data from the received modulated digital data communication signal.

5. The method of claim 4, wherein demodulating the digital data from the received modulated digital data communication signal includes demodulating the digital data from the non-linear chirp carrier waveform.

6. A method of digital communication, the method comprising:

obtaining digital data for transmission by a transmitting communicator;

the transmitting communicator modulating the digital data into a modulated digital data communication signal that is invariant to a stretched frequency scale resulting from a lack of synchronization with a receiving communicator, modulating the digital data into the modulated digital data communication signal includes modulating the digital data onto a non-linear chirp carrier waveform where the non-linear chirp carrier waveform is an exponential chirp carrier waveform;

wherein modulating the digital data onto the exponential chirp carrier waveform includes modulating the digital data using the equations:

$$f(t) = f_0 k^t$$

-continued $$k = T\sqrt[T]{\frac{f_T}{f_0}}$$

$$\varphi(t) = \varphi_0 + 2\pi f_0 \frac{(k^t - 1)}{\ln k}$$

where f(t) is an instantaneous frequency as a function of time; $f_0$ is the frequency at time t=0; $f_T$ is the frequency at time t=T, where T is the duration of one symbol; φ(t) is the phase as a function of time; and $\phi_0$ is the phase at time t=0; and the transmitting communicator transmitting the modulated digital data communication signal.

7. A transmitting communicator of a digital communication system, the transmitting communicator including:

an interface that can obtain digital data for transmission;

a modulator connected to the interface, the modulator modulates the digital data into a modulated digital data communication signal that is invariant to a stretched frequency scale resulting from a lack of synchronization with a receiving communicator, wherein the modulator modulates the digital data onto a non-linear chirp carrier waveform where the non-linear chirp carrier waveform is a hyperbolic chirp carrier waveform;

the modulator modulates the digital data onto the hyperbolic chirp carrier waveform using the equations:

$$f(t) = \frac{f_0}{kt+1}, kt > -1$$

$$k = \frac{f_0 - f_T}{f_T T}$$

$$\varphi(t) = \varphi_0 + 2\pi f_0 \frac{\ln(kt+1)}{k}$$

where f(t) is an instantaneous frequency as a function of time; $f_0$ is the frequency at time t=0; $f_T$ is the frequency at time t=T, where T is the duration of one symbol; φ(t) is the phase as a function of time; and $\phi_0$ is the phase at time t=0; and an antenna connected to the modulator, the antenna transmits the modulated digital data communication signal.

8. A transmitting communicator of a digital communication system, the transmitting communicator including:

an interface that can obtain digital data for transmission;

a modulator connected to the interface, the modulator modulates the digital data into a modulated digital data communication signal that is invariant to a stretched frequency scale resulting from a lack of synchronization with a receiving communicator, wherein the modulator modulates the digital data onto a non-linear chirp carrier waveform where the non-linear chirp carrier waveform is an exponential chirp carrier waveform;

wherein the modulator modulates the digital data onto the exponential chirp carrier waveform using the equations:

$$f(t) = f_0 k^t$$

$$k = T\sqrt[T]{\frac{f_T}{f_0}}$$

$$\varphi(t) = \varphi_0 + 2\pi f_0 \frac{(k^t - 1)}{\ln k}$$

where f(t) is an instantaneous frequency as a function of time; $f_0$ is the frequency at time t=0; $f_T$ is the frequency at time t=T, where T is the duration of one symbol; φ(t) is the phase as a function of time; and $\phi_0$ is the phase at time t=0; and an antenna connected to the modulator, the antenna transmits the modulated digital data communication signal.

9. The digital communication system of claim 1, wherein the transmitting communicator is a transceiver or a transmitter, and the receiving communicator is a receiver or a transceiver.

10. The digital communication system of claim 9, wherein the transmitting communicator is located below ground, and the receiving communicator is located above ground.

11. The method of claim 4, wherein the transmitting communicator is a transceiver or a transmitter, and the receiving communicator is a receiver or a transceiver.

12. The transmitting communicator of claim 7, wherein the transmitting communicator is a transceiver or a transmitter.

13. The digital communication system of claim 2, wherein the transmitting communicator is a transceiver or a transmitter, and the receiving communicator is a receiver or a transceiver.

14. The digital communication system of claim 13, wherein the transmitting communicator is located below ground, and the receiving communicator is located above ground.

15. The method of claim 6, further comprising:

a receiving communicator that receives the modulated digital data communication signal; and the receiving communicator demodulating the digital data from the received modulated digital data communication signal.

16. The method of claim 15, wherein demodulating the digital data from the received modulated digital data communication signal includes demodulating the digital data from the non-linear chirp carrier waveform.

17. The method of claim 6, wherein the transmitting communicator is a transceiver or a transmitter, and the receiving communicator is a receiver or a transceiver.

18. The transmitting communicator of claim 8, wherein the transmitting communicator is a transceiver or a transmitter.

* * * * *